United States Patent
Bajpai et al.

(10) Patent No.: US 9,487,235 B2
(45) Date of Patent: Nov. 8, 2016

(54) VEHICLE CONTROL SYSTEM WITH ADAPTIVE WHEEL ANGLE CORRECTION

(71) Applicant: MAGNA ELECTRONICS INC., Auburn Hills, MI (US)

(72) Inventors: Devendra Bajpai, Bloomfield Hills, MI (US); Honghao Tan, Northville, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 14/675,928

(22) Filed: Apr. 1, 2015

(65) Prior Publication Data

US 2015/0291215 A1    Oct. 15, 2015

Related U.S. Application Data

(60) Provisional application No. 61/977,929, filed on Apr. 10, 2014.

(51) Int. Cl.
*B62D 15/02* (2006.01)
*G06K 9/00* (2006.01)

(52) U.S. Cl.
CPC ......... *B62D 15/025* (2013.01); *G06K 9/00798* (2013.01)

(58) Field of Classification Search
CPC .......... B62D 15/025; B60W 2420/42; B60W 30/12; G06K 9/00805; G06K 9/00825; G06K 9/00798; B60T 2201/08; B60T 8/17557
USPC ...... 701/41, 28, 300, 70, 301; 340/400, 401; 348/135; 382/104, 181
See application file for complete search history.

(56) References Cited

U.S. PATENT DOCUMENTS

| | | |
|---|---|---|
| 5,289,182 A | 2/1994 | Brillard et al. |
| 5,289,321 A | 2/1994 | Secor |
| 5,313,072 A | 5/1994 | Vachss |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,406,395 A | 4/1995 | Wilson et al. |
| 5,408,346 A | 4/1995 | Trissel et al. |
| 5,410,346 A | 4/1995 | Saneyoshi et al. |
| 5,414,257 A | 5/1995 | Stanton |
| 5,414,461 A | 5/1995 | Kishi et al. |
| 5,416,478 A | 5/1995 | Morinaga |
| 5,424,952 A | 6/1995 | Asayama |
| 5,426,294 A | 6/1995 | Kobayashi et al. |

(Continued)

*Primary Examiner* — Dalena Tran
(74) *Attorney, Agent, or Firm* — Gardner, Linn, Burkhart & Flory, LLP

(57) ABSTRACT

A control system of a vehicle includes an image sensor and a control having an image processor. The image sensor is disposed at the vehicle and has a field of view exterior and forward of the vehicle. The image processor is operable to process image data captured by the image sensor to determine a curvature of a road being traveled by the vehicle. Responsive at least in part to processing by the image processor of captured image data, the control is operable to determine tangents at locations along the determined curvature. Responsive to determination of the tangents, the control is operable generate an output to adjust the vehicle steering to guide the vehicle in a direction that generally corresponds to determined tangents at respective locations of the vehicle's path of travel along the curvature of the road.

20 Claims, 4 Drawing Sheets

(56) References Cited

U.S. PATENT DOCUMENTS

| | | |
|---|---|---|
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,614,788 A | 3/1997 | Mullins et al. |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,920,367 A | 7/1999 | Kajimoto et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,144,022 A | 11/2000 | Tenenbaum et al. |
| 6,175,300 B1 | 1/2001 | Kendrick |
| 6,178,034 B1 | 1/2001 | Allemand et al. |
| 6,198,409 B1 | 3/2001 | Schofield et al. |
| 6,223,114 B1 | 4/2001 | Boros et al. |
| 6,226,061 B1 | 5/2001 | Tagusa |
| 6,227,689 B1 | 5/2001 | Miller |
| 6,256,561 B1 * | 7/2001 | Asanuma ............ B62D 15/025 180/197 |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,176 B1 | 11/2001 | Schofield et al. |
| 6,320,282 B1 | 11/2001 | Caldwell |
| 6,333,759 B1 | 12/2001 | Mazzilli |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,497,503 B1 | 12/2002 | Dassanayake et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,698 B2 | 7/2003 | Stam et al. |
| 6,594,583 B2 | 7/2003 | Ogura et al. |
| 6,611,610 B1 | 8/2003 | Stam et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,735,506 B2 | 5/2004 | Breed et al. |
| 6,741,377 B2 | 5/2004 | Miles |
| 6,744,353 B2 | 6/2004 | Sjönell |
| 6,762,867 B2 | 7/2004 | Lippert et al. |
| 6,794,119 B2 | 9/2004 | Miles |
| 6,795,221 B1 | 9/2004 | Urey |
| 6,807,287 B1 | 10/2004 | Hermans |
| 6,819,231 B2 | 11/2004 | Berberich et al. |
| 6,823,241 B2 | 11/2004 | Shirato et al. |

(56) References Cited

U.S. PATENT DOCUMENTS

| | | | |
|---|---|---|---|
| 6,864,930 B2 | 3/2005 | Matsushita et al. | |
| 6,882,287 B2 | 4/2005 | Schofield | |
| 6,889,161 B2 | 5/2005 | Winner et al. | |
| 6,909,753 B2 | 6/2005 | Meehan et al. | |
| 6,946,978 B2 | 9/2005 | Schofield | |
| 6,975,775 B2 | 12/2005 | Rykowski et al. | |
| 6,989,736 B2 | 1/2006 | Berberich et al. | |
| 7,038,577 B2 | 5/2006 | Pawlicki et al. | |
| 7,062,300 B1 | 6/2006 | Kim | |
| 7,065,432 B2 | 6/2006 | Moisel et al. | |
| 7,079,017 B2 | 7/2006 | Lang et al. | |
| 7,085,637 B2 | 8/2006 | Breed et al. | |
| 7,092,548 B2 | 8/2006 | Laumeyer et al. | |
| 7,111,968 B2 | 9/2006 | Bauer et al. | |
| 7,113,867 B1 | 9/2006 | Stein | |
| 7,116,246 B2 | 10/2006 | Winter et al. | |
| 7,133,661 B2 | 11/2006 | Hatae et al. | |
| 7,145,519 B2 | 12/2006 | Takahashi et al. | |
| 7,149,613 B2 | 12/2006 | Stam et al. | |
| 7,151,996 B2 | 12/2006 | Stein | |
| 7,161,616 B1 | 1/2007 | Okamoto et al. | |
| 7,202,776 B2 | 4/2007 | Breed | |
| 7,216,023 B2 * | 5/2007 | Akita | B62D 15/025 348/148 |
| 7,227,611 B2 | 6/2007 | Hull et al. | |
| 7,355,526 B2 | 4/2008 | Huang | |
| 7,375,803 B1 | 5/2008 | Bamji | |
| 7,400,236 B2 | 7/2008 | Kade et al. | |
| 7,423,821 B2 | 9/2008 | Bechtel et al. | |
| 7,424,364 B2 | 9/2008 | Gern et al. | |
| 7,460,951 B2 | 12/2008 | Altan et al. | |
| 7,510,038 B2 | 3/2009 | Kauffmann et al. | |
| 7,532,109 B2 | 5/2009 | Takahama et al. | |
| 7,541,743 B2 | 6/2009 | Salmeen et al. | |
| 7,557,732 B2 | 7/2009 | Kataoka et al. | |
| 7,561,032 B2 | 7/2009 | Huang et al. | |
| 7,565,006 B2 | 7/2009 | Stam et al. | |
| 7,566,851 B2 | 7/2009 | Stein et al. | |
| 7,592,928 B2 | 9/2009 | Chinomi et al. | |
| 7,605,856 B2 | 10/2009 | Imoto | |
| 7,639,149 B2 | 12/2009 | Katoh | |
| 7,681,960 B2 | 3/2010 | Wanke et al. | |
| 7,720,580 B2 | 5/2010 | Higgins-Luthman | |
| 7,777,611 B2 | 8/2010 | Desai | |
| 7,786,898 B2 | 8/2010 | Stein et al. | |
| 7,809,483 B2 * | 10/2010 | Nishikawa | B60W 30/12 180/167 |
| 7,843,451 B2 | 11/2010 | Lafon | |
| 7,855,778 B2 | 12/2010 | Yung et al. | |
| 7,881,496 B2 | 2/2011 | Camilleri et al. | |
| 7,885,730 B2 | 2/2011 | Kauffmann et al. | |
| 7,930,160 B1 | 4/2011 | Hosagrahara et al. | |
| 7,949,486 B2 | 5/2011 | Denny et al. | |
| 8,017,898 B2 | 9/2011 | Lu et al. | |
| 8,027,029 B2 | 9/2011 | Lu et al. | |
| 8,058,977 B2 | 11/2011 | Lynam | |
| 8,064,643 B2 | 11/2011 | Stein et al. | |
| 8,082,101 B2 | 12/2011 | Stein et al. | |
| 8,095,310 B2 | 1/2012 | Taylor et al. | |
| 8,164,628 B2 | 4/2012 | Stein et al. | |
| 8,224,031 B2 | 7/2012 | Saito | |
| 8,233,045 B2 | 7/2012 | Luo et al. | |
| 8,254,635 B2 | 8/2012 | Stein et al. | |
| 8,300,886 B2 | 10/2012 | Hoffmann | |
| 8,378,851 B2 | 2/2013 | Stein et al. | |
| 8,421,865 B2 | 4/2013 | Euler et al. | |
| 8,452,055 B2 | 5/2013 | Stein et al. | |
| 8,534,887 B2 | 9/2013 | Deline et al. | |
| 8,553,088 B2 | 10/2013 | Stein et al. | |
| 8,694,224 B2 | 4/2014 | Chundrlik, Jr. et al. | |
| 9,205,776 B2 | 12/2015 | Turk | |
| 2002/0005778 A1 | 1/2002 | Breed | |
| 2002/0011611 A1 | 1/2002 | Huang et al. | |
| 2002/0015153 A1 | 2/2002 | Downs | |
| 2002/0041229 A1 | 4/2002 | Satoh et al. | |
| 2002/0113873 A1 | 8/2002 | Williams | |
| 2002/0169531 A1 | 11/2002 | Kawazoe et al. | |
| 2003/0103142 A1 | 6/2003 | Hitomi et al. | |
| 2003/0137586 A1 | 7/2003 | Lewellen | |
| 2003/0222982 A1 | 12/2003 | Hamdan et al. | |
| 2004/0114381 A1 | 6/2004 | Salmeen et al. | |
| 2004/0164228 A1 | 8/2004 | Fogg et al. | |
| 2004/0262063 A1 | 12/2004 | Kaufmann et al. | |
| 2005/0125125 A1 | 6/2005 | Matsumoto et al. | |
| 2005/0219852 A1 | 10/2005 | Stam et al. | |
| 2005/0237385 A1 | 10/2005 | Kosaka et al. | |
| 2005/0273234 A1 | 12/2005 | Rattapon et al. | |
| 2005/0273261 A1 | 12/2005 | Niwa et al. | |
| 2005/0278096 A1 | 12/2005 | Iwazaki et al. | |
| 2006/0018511 A1 | 1/2006 | Stam et al. | |
| 2006/0018512 A1 | 1/2006 | Stam et al. | |
| 2006/0030987 A1 | 2/2006 | Akita | |
| 2006/0047388 A1 | 3/2006 | Oka et al. | |
| 2006/0091813 A1 | 5/2006 | Stam et al. | |
| 2006/0103727 A1 | 5/2006 | Tseng | |
| 2006/0164514 A1 | 7/2006 | Muramatsu et al. | |
| 2006/0250501 A1 | 11/2006 | Wildmann et al. | |
| 2007/0024724 A1 | 2/2007 | Stein et al. | |
| 2007/0100551 A1 | 5/2007 | Ishikura | |
| 2007/0104476 A1 | 5/2007 | Yasutomi et al. | |
| 2007/0225914 A1 | 9/2007 | Kawazoe et al. | |
| 2007/0233343 A1 | 10/2007 | Saito et al. | |
| 2007/0233386 A1 | 10/2007 | Saito et al. | |
| 2007/0242339 A1 | 10/2007 | Bradley | |
| 2008/0043099 A1 | 2/2008 | Stein et al. | |
| 2008/0061952 A1 | 3/2008 | Maass | |
| 2008/0080740 A1 | 4/2008 | Kaufmann | |
| 2008/0147321 A1 | 6/2008 | Howard et al. | |
| 2008/0192132 A1 | 8/2008 | Bechtel et al. | |
| 2008/0266396 A1 | 10/2008 | Stein | |
| 2008/0278349 A1 | 11/2008 | Kataoka et al. | |
| 2009/0024279 A1 | 1/2009 | Takeda et al. | |
| 2009/0085913 A1 | 4/2009 | Sakamoto et al. | |
| 2009/0113509 A1 | 4/2009 | Tseng et al. | |
| 2009/0153360 A1 | 6/2009 | Kim | |
| 2009/0160987 A1 | 6/2009 | Bechtel et al. | |
| 2009/0190015 A1 | 7/2009 | Bechtel et al. | |
| 2009/0256938 A1 | 10/2009 | Bechtel et al. | |
| 2009/0284360 A1 | 11/2009 | Litkouhi | |
| 2009/0290032 A1 | 11/2009 | Zhang et al. | |
| 2010/0097469 A1 | 4/2010 | Blank et al. | |
| 2010/0114431 A1 | 5/2010 | Switkes et al. | |
| 2010/0145575 A1 | 6/2010 | Switkes et al. | |
| 2010/0182139 A1 | 7/2010 | Chen et al. | |
| 2010/0191421 A1 * | 7/2010 | Nilsson | B62D 15/025 701/41 |
| 2011/0216201 A1 | 9/2011 | McAndrew et al. | |
| 2011/0231062 A1 | 9/2011 | Kim | |
| 2012/0045112 A1 | 2/2012 | Lundblad et al. | |
| 2012/0062743 A1 | 3/2012 | Lynam et al. | |
| 2012/0069185 A1 | 3/2012 | Stein | |
| 2012/0200707 A1 | 8/2012 | Stein et al. | |
| 2012/0314071 A1 | 12/2012 | Rosenbaum et al. | |
| 2012/0320209 A1 | 12/2012 | Vico | |
| 2012/0320210 A1 | 12/2012 | Imai et al. | |
| 2013/0093888 A1 | 4/2013 | Kim | |
| 2013/0141580 A1 | 6/2013 | Stein et al. | |
| 2013/0147957 A1 | 6/2013 | Stein | |
| 2013/0169812 A1 | 7/2013 | Lu et al. | |
| 2013/0231825 A1 | 9/2013 | Chundrlik, Jr. | |
| 2013/0231830 A1 | 9/2013 | Van Dan Elzen et al. | |
| 2013/0286193 A1 | 10/2013 | Pflug | |
| 2013/0293717 A1 | 11/2013 | Zhang et al. | |
| 2013/0314503 A1 | 11/2013 | Nix et al. | |
| 2014/0043473 A1 | 2/2014 | Rathi et al. | |
| 2014/0052340 A1 | 2/2014 | Bajpai | |
| 2014/0063254 A1 | 3/2014 | Shi et al. | |
| 2014/0098229 A1 | 4/2014 | Lu et al. | |
| 2014/0229073 A1 * | 8/2014 | Mori | B62D 15/025 701/42 |
| 2014/0247352 A1 | 9/2014 | Rathi et al. | |
| 2014/0247354 A1 | 9/2014 | Knudsen | |
| 2014/0320658 A1 | 10/2014 | Pliefke | |

(56) References Cited

U.S. PATENT DOCUMENTS

2014/0333729 A1 11/2014 Pflug
2014/0347486 A1 11/2014 Okouneva
2015/0002670 A1 1/2015 Bajpai
2015/0266422 A1 9/2015 Chundrlik, Jr. et al.

* cited by examiner

VEHICLE CONTROL SYSTEM WITH ADAPTIVE WHEEL ANGLE CORRECTION

CROSS REFERENCE TO RELATED APPLICATION

The present application claims the filing benefits of U.S. provisional application Ser. No. 61/977,929, filed Apr. 10, 2014, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides an adaptive steering or wheel angle correction to guide or maintain the vehicle within its lane boundaries as the vehicle is driven along a road.

The vision system or control system of the present invention uses a sensor disposed at a vehicle and having a field of view exterior of the vehicle (such as an image sensor or camera having a field of view forward of the vehicle), whereby a processor is operable to process data captured by the sensor to determine a curvature of the road being traveled by the vehicle. The processor is operable to determine tangents at locations along the determined curvature and, responsive to a determination of the tangents, the processor generates an output to a vehicle control. The control, responsive to the output, is operable to adjust the vehicle steering to guide the vehicle in a direction that generally corresponds to a determined tangent at respective locations of the vehicle along the curved road. The processor may generate the output at least in part responsive to at least one of a vehicle yaw rate, a vehicle velocity and a vehicle lateral acceleration. The control may adjust the vehicle steering to have a front wheel of the vehicle generally parallel to a tangent of the road at the end of the curvature, whereby the vehicle is traveling substantially straight along the road following the road curvature.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system and/or control system operates to capture images exterior of the vehicle and may process the captured image data to display images and to detect objects at or near the vehicle and in the predicted path of the vehicle, such as to assist a driver of the vehicle in maneuvering the vehicle in a rearward or forward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
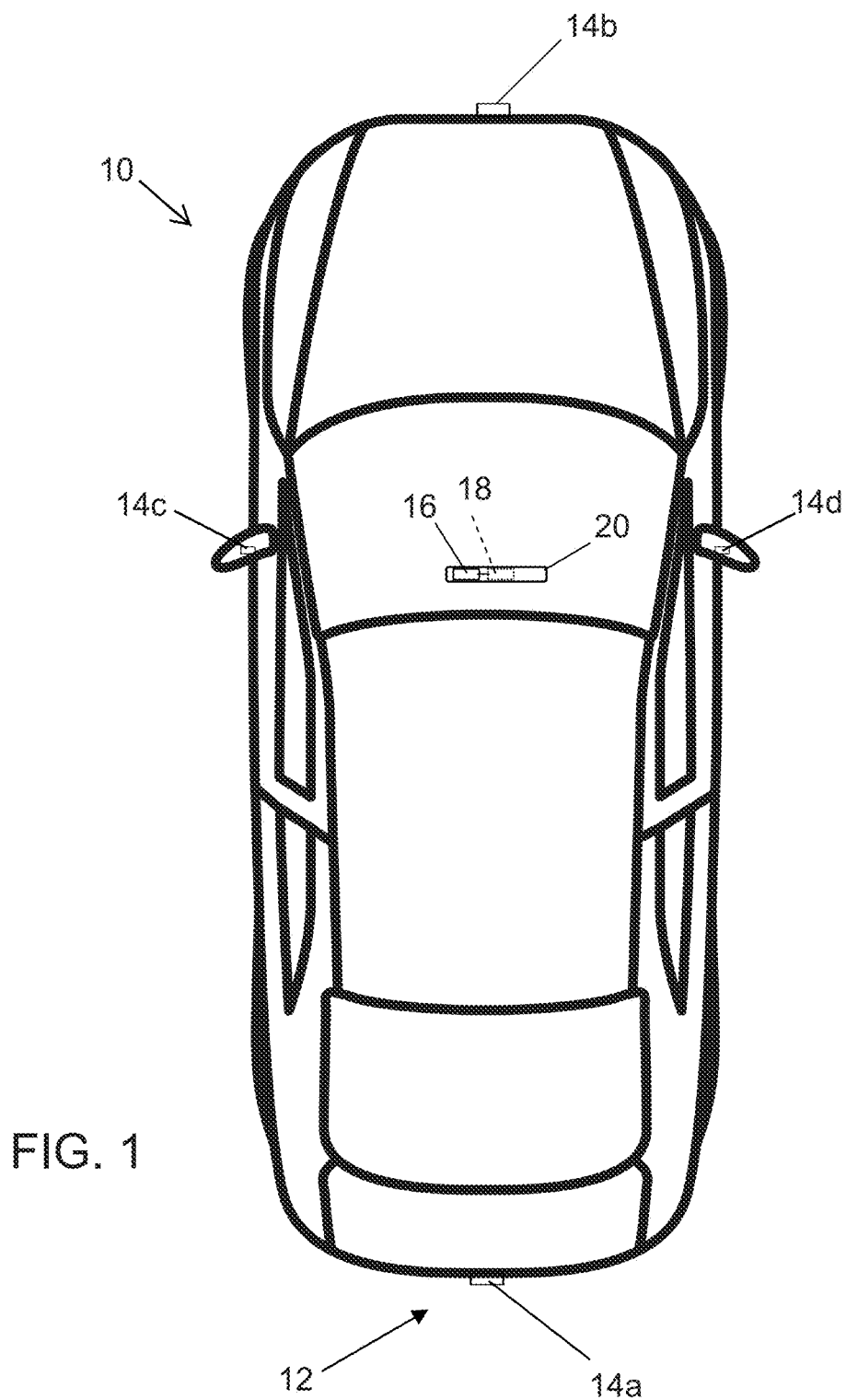
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
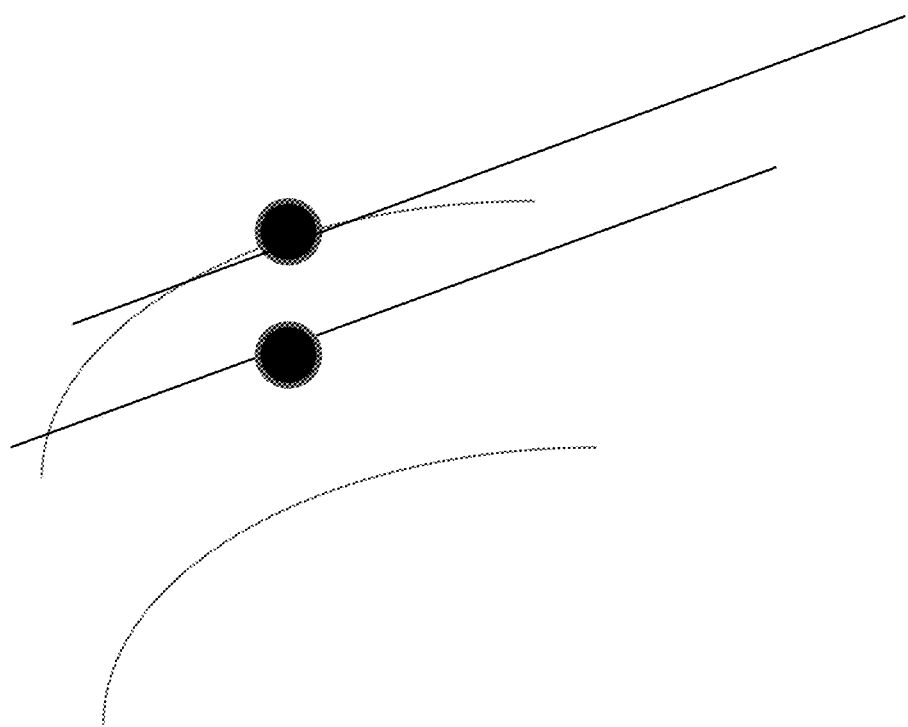
FIG. 2 is a schematic of a vehicle driving direction along a tangent of a curve in accordance with the present invention.

The system of the present invention determines a lane of travel ahead of the vehicle (such as be determining lane markers or the like) and adjusts the steering of the vehicle to guide or steer the vehicle along a curvature of the lane. The lane keeping algorithm of the present invention applies a correction (such as a torque to the steering mechanism) to keep the vehicle within the determined lane boundaries. After the correction has been applied (to guide the vehicle along the curvature), there is a residual wheel angle (even after the vehicle has traversed through the curved path and is at a straight or straighter section of road after the curved section of road), which causes the vehicle to cross the center line of the lane. The present invention provides an algorithm that determines a wheel angle correction such that the wheel angle is corrected such that the vehicle is parallel to a tangent of the road curvature (such that, at the end of the maneuver the vehicle has zero lateral acceleration, and zero lateral velocity). For example, FIG. 2 shows the tangents at points along a curved section of road.

Figure 3:
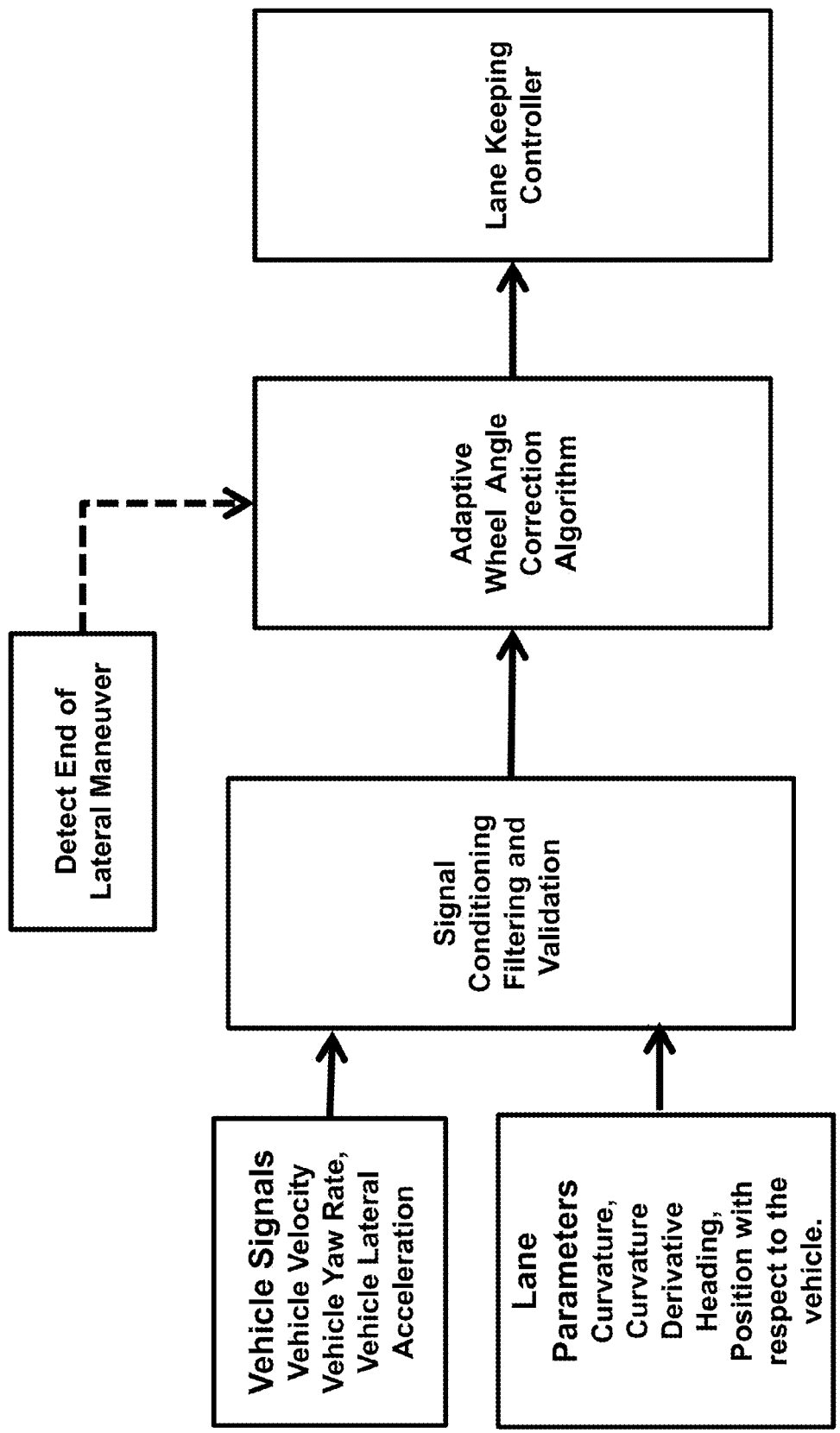
FIG. 3 is a block diagram of the adaptive wheel angle correction system of the present invention.

As shown in FIG. 3, the system may receive signals pertaining to vehicle velocity, yaw rate and lateral acceleration, and may determine lane parameters, such as curvature, a curvature derivative heading and position with respect to the vehicle. The signals are conditioned and/or filtered and/or validated and then fed to the algorithm, which determines the degree of adjustment or steering to apply to the vehicle to guide or steer the vehicle along the curve and within the lane boundaries. The system may determine the end of a lateral maneuver so the algorithm can determine when to stop the processing. The lane keeping controller, responsive to processing of the algorithm, is operable to adjust the steering or apply a torque to adjust or steer the vehicle.

Figure 4:
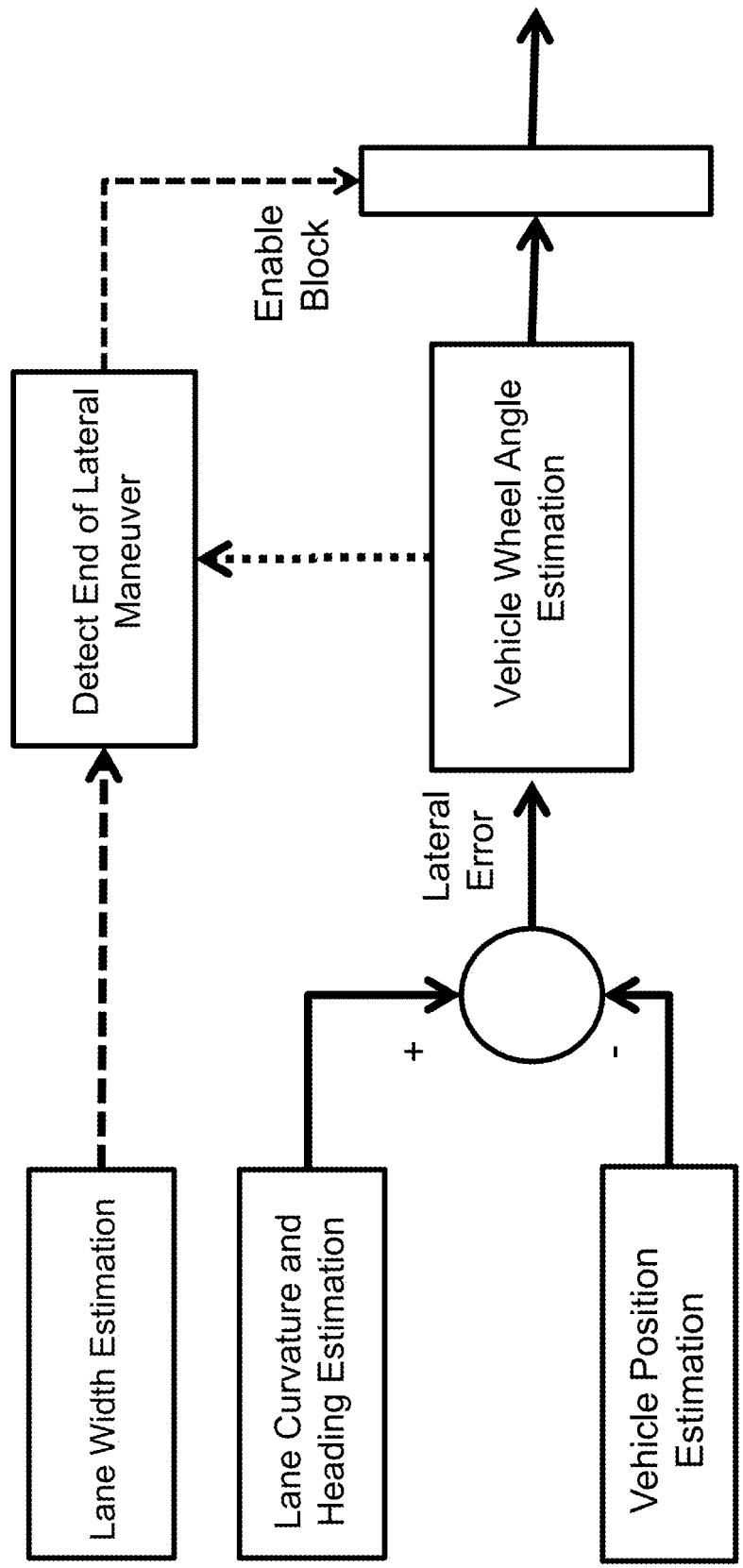
FIG. 4 is a block diagram of an adaptive wheel angle correction algorithm used by the system of the present invention.

As shown in FIG. 4, the algorithm compares the lane curvature and heading estimation with the vehicle position estimation to determine a lateral error and a vehicle wheel angle estimation (to steer the vehicle along the curve in the road).

The system and algorithm may determine the lane markers or boundaries and lane curvature and relative vehicle position via any suitable means. For example, the system may determine the lane markers or boundaries and lane curvature and relative vehicle position via image processing of image data captured by a forward viewing camera of the vehicle (and optionally one or more other cameras or sensors of the vehicle, such as a rearward viewing camera and/or sideward viewing cameras or the like). The system may determine the curvature of the lane in which the vehicle is traveling by utilizing aspects of the systems described in U.S. patent application Ser. No. 14/663,502, filed Mar. 20, 2015 and published Sep. 24, 2015 as U.S. Publication No. US-2015-0266422, which is hereby incorporated herein by reference in its entirety.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/116043; WO 2012/145313; WO 2012/145501; WO 2012/145818; WO 2012/145822; WO 2012/158167; WO 2012/075250; WO 2012/116043; WO 2012/145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392;

6,320,176; 6,313,454 and/or 6,824,281, and/or International Publication Nos. WO 2010/099416; WO 2011/028686 and/or WO 2013/016409, and/or U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149, and/or U.S. Publication No. US-2006-0061008, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A control system of a vehicle, said control system comprising:
   an image sensor disposed at a vehicle and having a field of view exterior and forward of the vehicle;
   a control comprising an image processor operable to process image data captured by said image sensor to determine a curvature of a road being traveled by the vehicle;
   wherein, responsive at least in part to processing by said image processor of captured image data, said control is operable to determine tangents at locations along the determined curvature;
   wherein, responsive to determination of the tangents, said control is operable generate an output to adjust a vehicle steering to guide the vehicle in a direction that generally corresponds to determined tangents at respective locations of the vehicle's path of travel along the curvature of the road; and
   wherein said control compares the determined curvature and a vehicle heading estimation with a vehicle position estimation to determine a lateral error and a vehicle wheel angle estimation to steer the vehicle along the curvature of the road.

2. The control system of claim 1, wherein said control, responsive at least in part to processing by said image processor of captured image data, determines an end of the curvature of the road where the road straightens.

3. The control system of claim 2, wherein said control, responsive to a determination that the vehicle is at the end of the curvature of the road, adjusts a wheel angle of the vehicle such that the vehicle is parallel to a tangent of the road at the end of the curvature of the road.

4. The control system of claim 3, wherein, when the wheel angle is adjusted to be parallel to the tangent of the road at the end of the curvature of the road, the vehicle has generally zero lateral acceleration and generally zero lateral velocity.

5. The control system of claim 1, wherein said control generates the output at least in part responsive to at least one of a vehicle yaw rate, a vehicle velocity and a vehicle lateral acceleration.

6. The control system of claim 1, wherein said control adjusts a wheel angle of the vehicle such that the vehicle is parallel to a tangent of the road curvature.

7. The control system of claim 6, wherein, at the end of the controlled maneuver along the curved road, the vehicle has generally zero lateral acceleration and generally zero lateral velocity.

8. The control system of claim 1, wherein said control comprises an algorithm that adjusts a wheel angle of a front wheel the vehicle such that the vehicle front wheel is generally parallel to the tangent of the road curvature.

9. The control system of claim 1, wherein said control, at least in part responsive to signals indicative of (i) vehicle velocity, (ii) vehicle yaw rate and (iii) vehicle lateral acceleration, determines lane parameters relative to the vehicle.

10. The control system of claim 9, wherein said determined lane parameters comprise a curvature derivative heading and position relative to the vehicle.

11. The control system of claim 9, wherein said control receives the signals and wherein an algorithm of said control determines the degree of steering adjustment to apply to the vehicle steering to guide the vehicle along the curve and within the lane boundaries.

12. The control system of claim 11, wherein said control determines an end of a turning maneuver so the algorithm can determine when to stop the processing of the signals.

13. A control system of a vehicle, said control system comprising:
   an image sensor disposed at a vehicle and having a field of view exterior and forward of the vehicle;
   a control comprising an image processor operable to process image data captured by said image sensor to determine a curvature of a road being traveled by the vehicle;
   wherein, responsive at least in part to processing by said image processor of captured image data, said control is operable to determine tangents at locations along the determined curvature;
   wherein said control generates the output at least in part responsive to at least one of a vehicle yaw rate, a vehicle velocity and a vehicle lateral acceleration;
   wherein said control, responsive at least in part to processing by said image processor of captured image data, determines an end of the curvature of the road where the road straightens;
   wherein, responsive to determination of the tangents, said control is operable generate an output to adjust a vehicle steering to guide the vehicle in a direction that generally corresponds to determined tangents at respective locations of the vehicle's path of travel along the curvature of the road;
   wherein said control, responsive to a determination that the vehicle is at the end of the curvature of the road, adjusts a wheel angle of the vehicle such that the vehicle is parallel to a tangent of the road at the end of the curvature of the road; and
   wherein said control compares the determined curvature and a vehicle heading estimation with a vehicle position estimation to determine a lateral error and a vehicle wheel angle estimation to steer the vehicle along the curvature of the road.

14. The control system of claim 13, wherein, when the wheel angle is adjusted to be parallel to the tangent of the road at the end of the curvature of the road, the vehicle has generally zero lateral acceleration and generally zero lateral velocity.

15. The control system of claim 13, wherein said control comprises an algorithm that adjusts a wheel angle of a front wheel the vehicle such that the vehicle front wheel is generally parallel to the tangent of the road curvature.

16. The control system of claim 13, wherein said control, at least in part responsive to signals indicative of (i) vehicle velocity, (ii) vehicle yaw rate and (iii) vehicle lateral acceleration, determines lane parameters relative to the vehicle, and wherein said determined lane parameters comprise a curvature derivative heading and position relative to the vehicle.

17. The control system of claim 16, wherein said control receives the signals and wherein an algorithm of said control determines the degree of steering adjustment to apply to the vehicle steering to guide the vehicle along the curve and within the lane boundaries, and wherein said control determines an end of a turning maneuver so the algorithm can determine when to stop the processing of the signals.

18. A control system of a vehicle, said control system comprising:
an image sensor disposed at a vehicle and having a field of view exterior and forward of the vehicle;
a control comprising an image processor operable to process image data captured by said image sensor to determine a curvature of a road being traveled by the vehicle;
wherein, responsive at least in part to processing by said image processor of captured image data, said control is operable to determine tangents at locations along the determined curvature;
wherein said control, responsive at least in part to processing by said image processor of captured image data, determines an end of the curvature of the road where the road straightens;
wherein, responsive to determination of the tangents, said control is operable generate an output to adjust a vehicle steering to guide the vehicle in a direction that generally corresponds to determined tangents at respective locations of the vehicle's path of travel along the curvature of the road;
wherein said control comprises an algorithm that adjusts a wheel angle of a front wheel the vehicle such that the vehicle front wheel is generally parallel to the tangent of the road curvature;
wherein said control, responsive to a determination that the vehicle is at the end of the curvature of the road, adjusts a wheel angle of the vehicle such that the vehicle is parallel to a tangent of the road at the end of the curvature of the road; and
wherein said control compares the determined curvature and a vehicle heading estimation with a vehicle position estimation to determine a lateral error and a vehicle wheel angle estimation to steer the vehicle along the curvature of the road.

19. The control system of claim 18, wherein said control, at least in part responsive to signals indicative of (i) vehicle velocity, (ii) vehicle yaw rate and (iii) vehicle lateral acceleration, determines lane parameters relative to the vehicle, and wherein said determined lane parameters comprise a curvature derivative heading and position relative to the vehicle.

20. The control system of claim 19, wherein said control receives the signals and wherein the algorithm of said control determines the degree of steering adjustment to apply to the vehicle steering to guide the vehicle along the curve and within the lane boundaries, and wherein said control determines an end of a turning maneuver so the algorithm can determine when to stop the processing of the signals.

* * * * *